United States Patent [19]

Nishi et al.

[11] Patent Number: 5,796,701
[45] Date of Patent: Aug. 18, 1998

[54] OPTICAL PICKUP AND OPTO-MAGNETIC SIGNAL REPRODUCING APPARATUS

[75] Inventors: Noriaki Nishi, Chiba; Kimihiro Saito, Saitama; Shuichi Matsumoto, Kanagawa; Masato Hattori, Chiba, all of Japan

[73] Assignee: Sony Corporation, Japan

[21] Appl. No.: 667,835

[22] Filed: Jun. 20, 1996

[30] Foreign Application Priority Data

Jun. 23, 1995 [JP] Japan .................. 7-180790

[51] Int. Cl.⁶ .................................................. G11B 7/00
[52] U.S. Cl. .................................. 369/110; 369/112
[58] Field of Search ............................. 369/110, 112, 369/13, 44.11, 44.14, 44.12

[56] References Cited

U.S. PATENT DOCUMENTS

| | | |
|---|---|---|
| 4,873,429 | 10/1989 | Kume et al. |
| 5,095,476 | 3/1992 | Greve et al. ............... 369/110 |
| 5,404,490 | 4/1995 | Matsubayashi et al. ....... 369/110 X |
| 5,438,562 | 8/1995 | Kobayashi et al. .......... 369/110 |
| 5,479,387 | 12/1995 | Ando et al. |
| 5,579,291 | 11/1996 | Matsumoto ............... 369/110 X |

FOREIGN PATENT DOCUMENTS

| | | | |
|---|---|---|---|
| 1-091344 | 4/1989 | Japan | 369/110 |
| 3-254448 | 11/1991 | Japan | 369/110 |
| 4-149840 | 5/1992 | Japan | 369/110 |
| 4-177673 | 6/1992 | Japan | 369/110 |
| 4-289541 | 10/1992 | Japan | 369/110 |
| 5-198030 | 8/1993 | Japan | 369/110 |
| 5-205339 | 8/1993 | Japan | 369/110 |

*Primary Examiner*—Paul W. Huber
*Attorney, Agent, or Firm*—Ronald P. Kananen

[57] ABSTRACT

An optical pickup includes a polarization component separation element which is formed as a unit or single piece of birefringence material. The separation element is not laminated obviating the need to carefully match the optical axes of the laminated pieces. Multiple reflections within the birefringent crystal which comprises the separation element improves the separation and resolution of the polarized components which are extracted from a laser beam reflected back off the media surface.

23 Claims, 12 Drawing Sheets

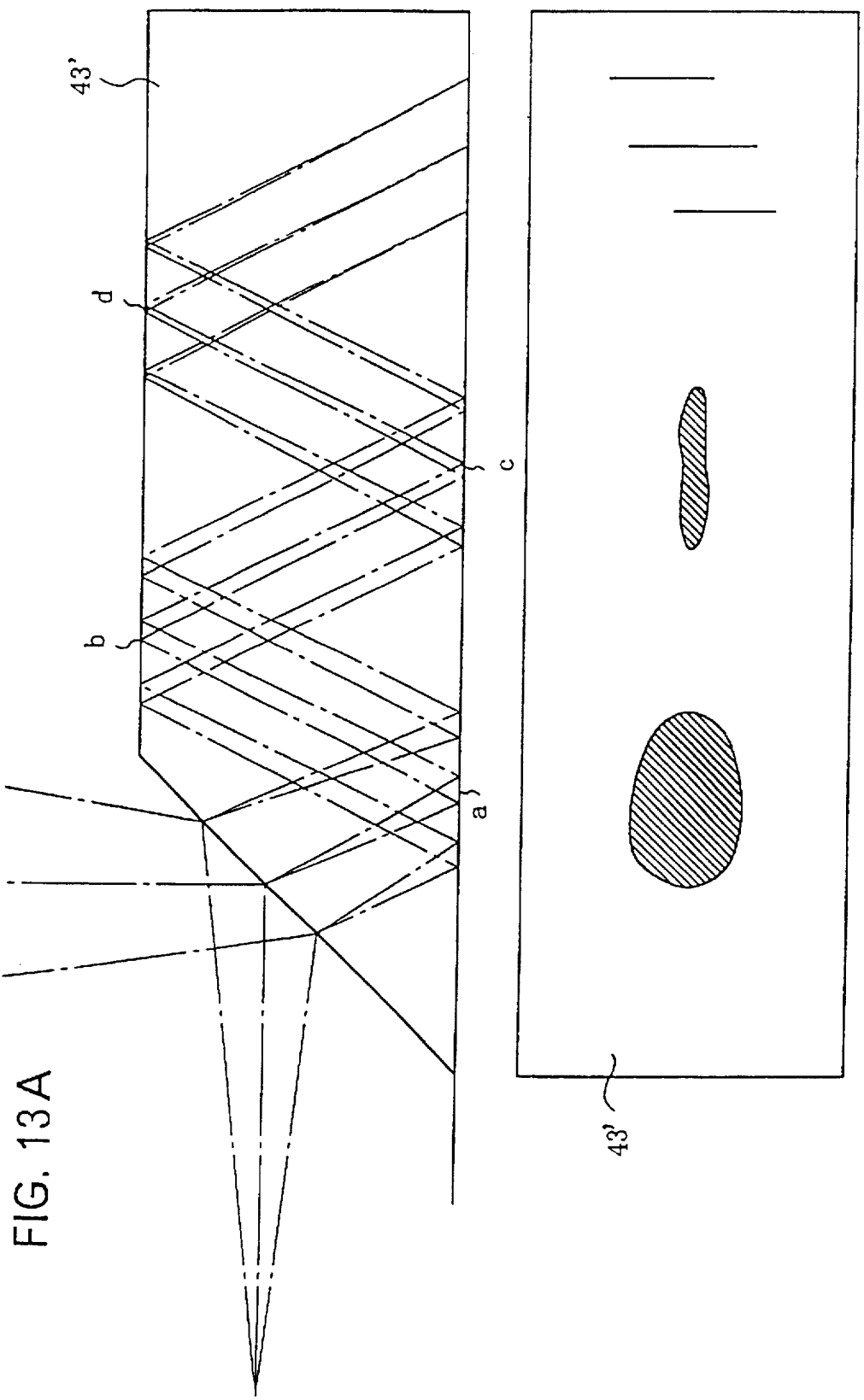

5,796,701

1

OPTICAL PICKUP AND OPTO-MAGNETIC SIGNAL REPRODUCING APPARATUS

BACKGROUND OF THE INVENTION

1. Field of the Invention

The present invention relates to an optical pickup. More particularly, the present invention relates to an optical pickup for an opto-magnetic signal reproducing apparatus.

2. Description of the Related Art

FIG. 1 shows an optical pickup for an opto-magnetic disc apparatus which is disclosed in U.S. Pat. No. 5,479,387 issued on Dec. 26, 1995 in the name of Ando et al. The optical pickup 1 is composed of a plurality of optical components 2 to 10. The optical pickup 1 condenses a laser beam emitted from a laser diode 2 and reflected from a opto-magnetic disc 11, via a grating element 3, a beam splitter 4, a collimator lens 5 and an objective lens 6, to form an image on a photodetector 9 via a Wollaston prism 7 and a multi-lens 8.

However, this type of optical pickup suffers from a drawback that miniaturization of the overall apparatus is difficult. This arrangement also suffers from the drawback that improvement in reliability is difficult because a plurality of optical components must be individually assembled. This renders the arrangement unsuitable for use in compact opto-magnetic disc types of reproducing apparatus wherein a small-sized highly reliable optical pickup is vital.

FIGS. 2A and 2B show a structure disclosed in U.S. Pat. No. 4,873,429 issued on Oct. 10, 1989 in the name of Kume et al., which has been proposed for use as an optical pickup in a compact disc player arrangement. This optical pickup 21 incorporates a laser diode LD, a glass beam splitter element 23, a semiconductor substrate 24 which on which photodetectors PD1 and PD2 and the like of elements are provided. As shown, these elements are enclosed in a housing 22.

The optical pickup 21 is arranged so that an opening in the housing 22 is sealed with a transparent member 25, and so that a non-polarizing semi-transparent film 26 is provided on an inclined surface of the trapezoidally sectioned glass beam splitter element 23. An adhesive film 27 is disposed between the beam splitter 23 and photodetector PD1 while a reflective film 28, which reflects the laser light reflected in the glass, is provided on the upper surface of the glass beam splitter element 23.

However, this optical pickup 21 cannot used for the reproduction of the opto-magnetic signals because the optical pickup 21 is a non-polarization type optical system.

SUMMARY OF THE INVENTION

It is accordingly an object of this invention to provide an optical pickup and opto-magnetic signal reproducing apparatus which are both small in size and highly reliable as compared with conventional counterparts.

The above and other objects are achieved by the provision of an optical pickup which comprises a semiconductor substrate on which a group of light receiving elements are formed, a light emitting element which is provided on the semiconductor substrate for emitting a light ray which is directed against an opto-magnetic signal recording medium, and a polarization component separation element which consists of a birefringence material unit for splitting the returned light ray reflected from the opto-magnetic signal recording medium, and for focussing the separated polarized light ray components on predetermined light receiving elements.

2

The returned light ray reflected on the opto-magnetic signal recording medium is assuredly separated in a predetermined direction which is determined by an optical axis of the birefringence material unit.

BRIEF DESCRIPTION OF THE DRAWINGS

The nature, principle and utility of the invention will become more apparent from the following detailed description taken in conjunction with the accompanying drawings in which like parts are designated by like reference numerals or characters and wherein:

FIG. 13 is a schematic diagram explaining the polarization component separation element for reflecting the ray four times within a crystal.

DETAILED DESCRIPTION OF THE EMBODIMENTS

The preferred embodiments of this invention will be described with reference to the accompanying drawings:

(1) Optical pickup (1-1) Birefringence

The optical pickup according to present invention features the use of a material which exhibits birefringence as a "polarization component separation element" wherein incident light is split and separated on the basis of its polarization components and wherein the separated components are multiply-reflected within the element to promote separation. The present invention further features the use of a unit, or single piece, of this material which exhibits birefringence to form a beam splitting prism or polarization component separation element. This structure avoids a need to laminate multiple pieces of birefringent material one upon another in a manner which requires the axial directions of the respective refraction ellipsoids, which represent the characteristic of the different pieces of birefringence material, to be carefully taken into consideration.

Figure 1:
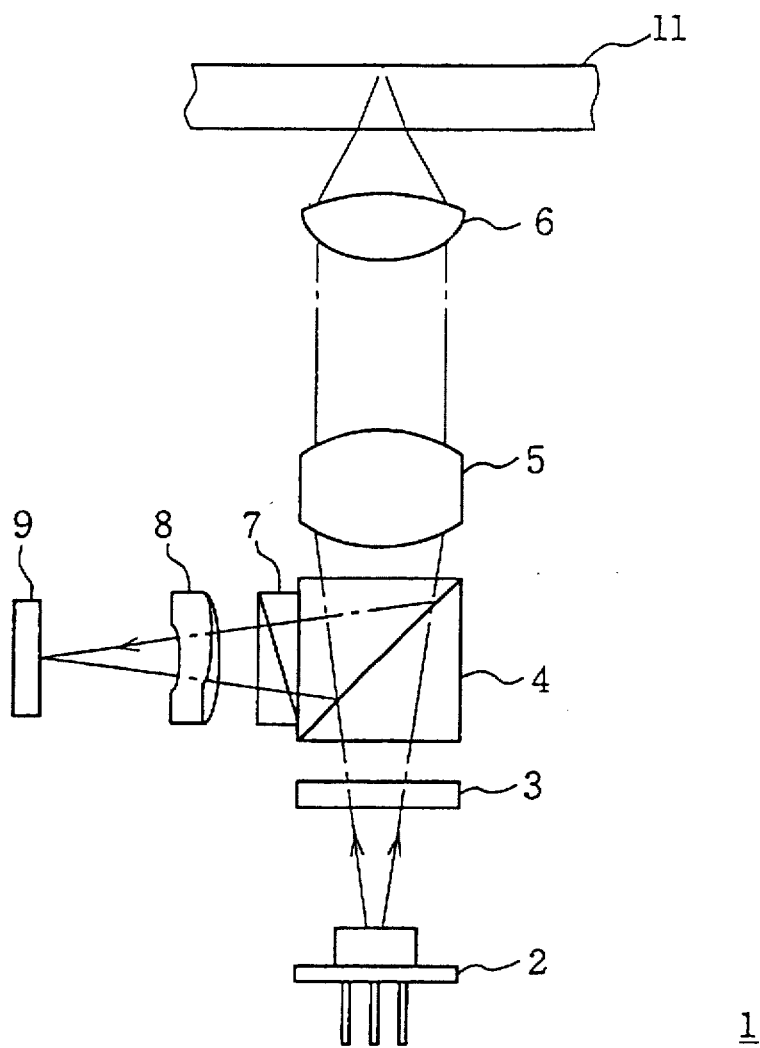
FIG. 1 is a schematic side view showing a conventional optical pickup used for the reproduction of the opto-magnetic signal.
Figure 2:
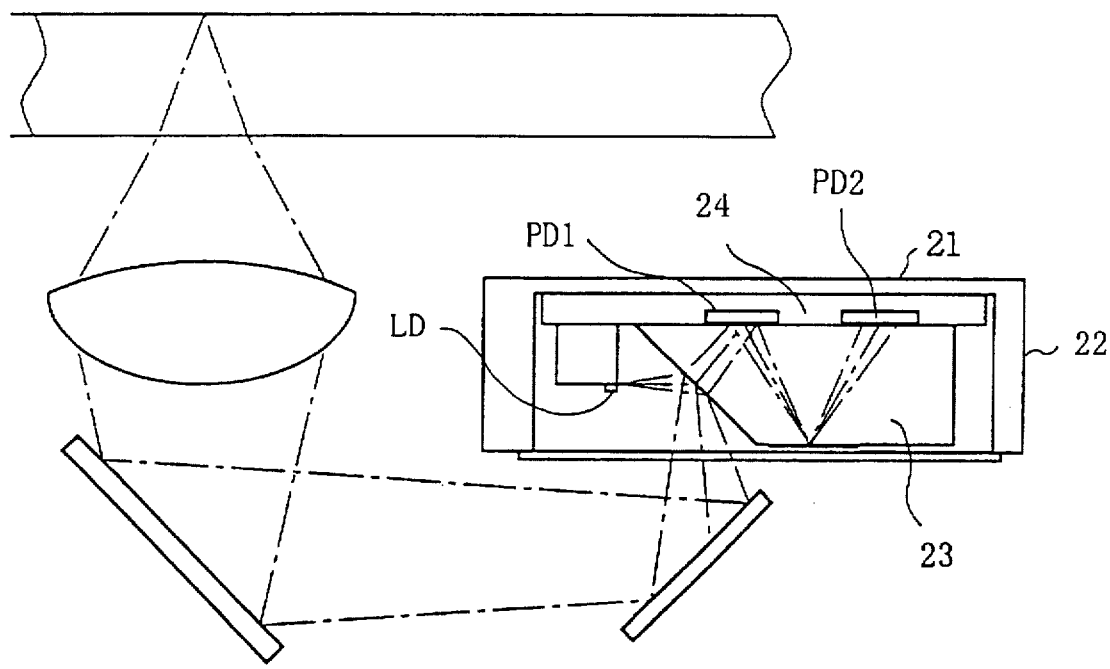
FIGS. 2A and 2B are schematic side views showing an optical pickup used for the reproduction of a compact disc.
Figure 2:
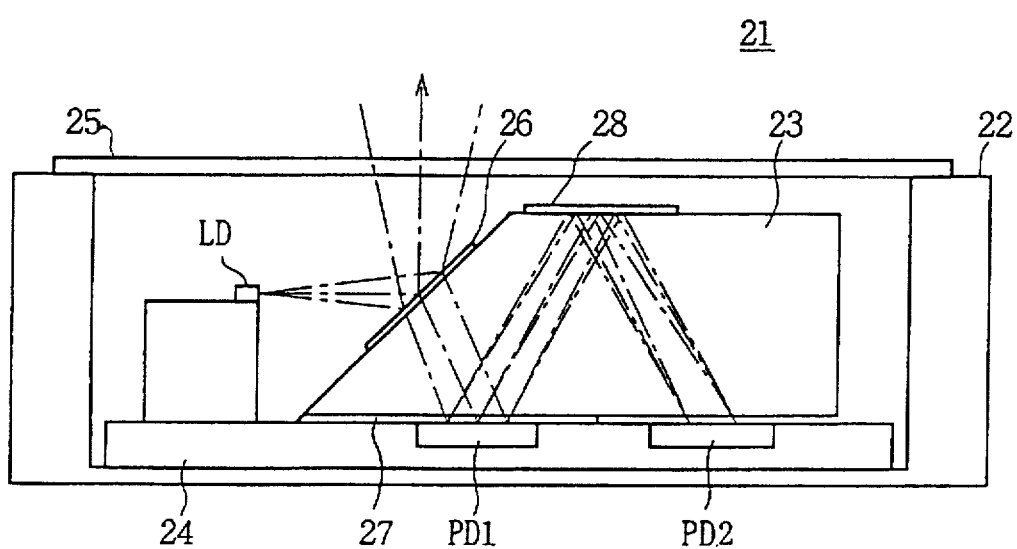
Figure 3:
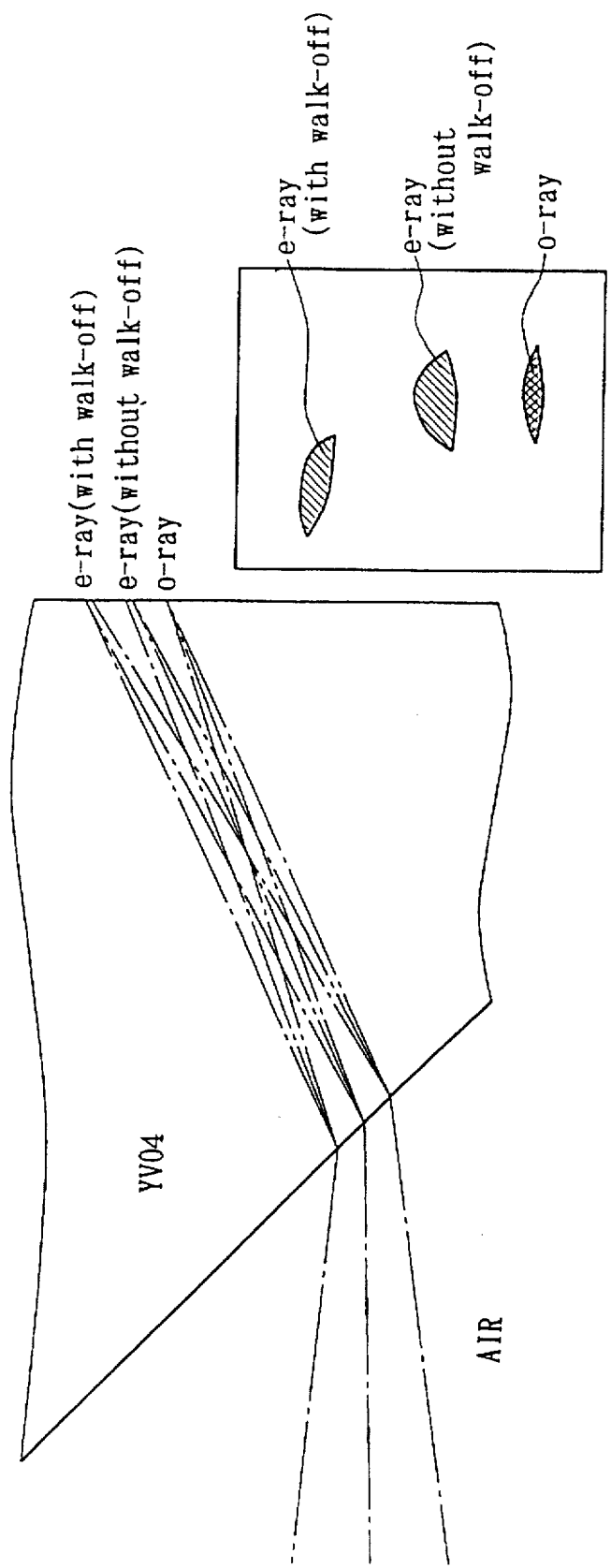
FIG. 3 is a schematic sectional view depicting the effect of birefringence.

It should be noted that the polarized light can be separated from the incident light ray at an interface whereat it passes into the element without being reflected inside the element. However, in such cases, it is important that each refraction direction is different at the interface depending on a difference in an electric displacement vector D (that is, the difference in a wave-normal direction k). This phenomenon is depicted in FIG. 3 which shows the separation between an ordinary ray (o-ray) and an extraordinary ray (e-ray without walk-off). More specifically, FIG. 3 shows a situation wherein converging light (in air) is incident on an uniaxial crystal YVO$_4$ (ne=2.1893 and no=1.9734 when λ=780 nm). It will be noted that the o-ray represents a light ray which follows Snell's law while the e-ray represents a light ray which does not obey this law. It should be noted that of the three rays which are depicted in FIG. 3, only the o-ray and the e-ray (with walk-off) actually exist and that the image of the e-ray (without walk-off) is illustrated based on an estimation of how it would appear if it did actually occur.

The embodiments of the invention feature the incident ray being reflected once or more in the separating element, and are such that birefringence constitutes a vital feature. Birefringence refers to a phenomenon wherein a vector S (equal to an electric field vector E of light wave×magnetic field vector H of the light wave) of the ray (a direction in which an optical energy progresses) is different when a vibration direction of the electric displacement vector D is different even if a wave-normal vector k in the crystal is the same. Birefringence is explained in more detail below.

Figure 4:
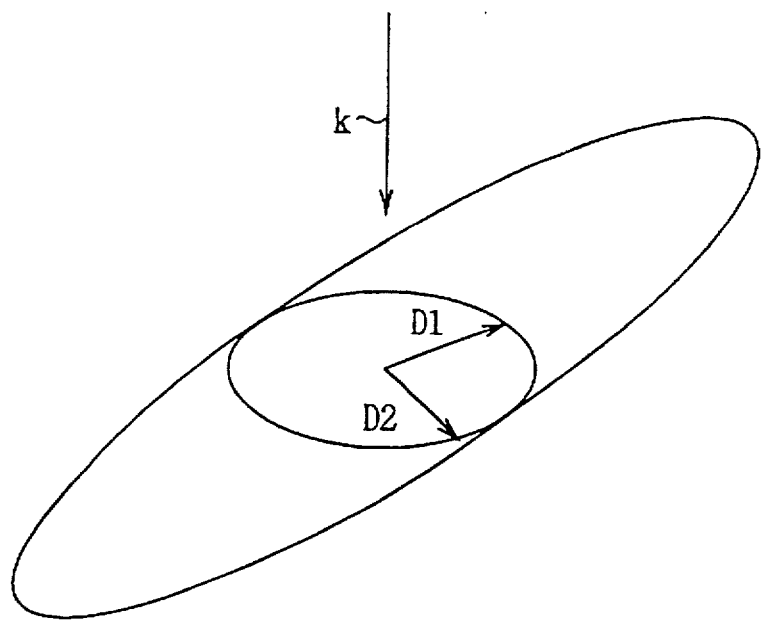
FIG. 4 is a schematic diagram showing an inherent polarizing direction seen from a side on which a ray is incident.

The refraction of a given light ray which progresses through birefringent material can be represented using the lengths of two axes of an ellipsoid which are formed when the refraction ellipsoid is cut with a plane surface passing through the origin so as to be perpendicular to a wavefront direction vector k of the ray. The axial direction at this time is a direction of an electric displacement vector D which corresponds to the refractive direction (see FIG. 4). When polarized light is allowed to be incident at an angle of about 45°, and is subsequently separated, the difference between the vectors D1 and D2 (see FIG. 4) can be used to derive the opto-magnetic signal.

Figure 5:
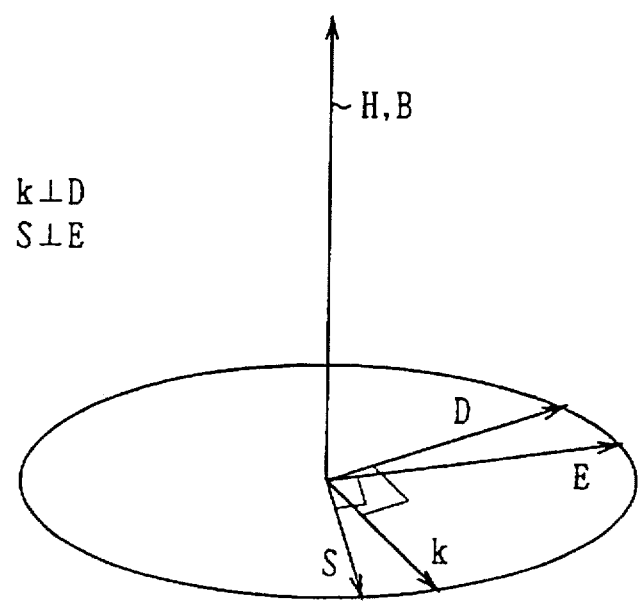
FIG. 5 is a schematic diagram showing a relation between a wave-normal direction and a direction in which ray energy progresses.

The difference in the refraction is, as shown in FIG. 5, the difference of the wave-normal vector k (the difference between the o-ray and the e-ray without walk-off). However, since the refractive index changes with the difference of the wave-normal vector k, the change in the refractive index needs to be taken into consideration.

The wave-normal vector k which is generated with the difference in the refraction can be determined in this manner with a set of the refractive index and an inherent polarizing vector D by using the fact that the wave-normal vector k follows Snell's law.

For reference, the difference in the wave-normal vector k is sufficient only for separating the polarization components. However, when an attempt is made to grasp assuredly how the separated ray progresses, it is required to consider that the wave-normal vector k is shifted, or undergoes walk-off, from the ray vector S.

The ray vector S is calculated using the following formula. Initially, an electric field vector E is obtained as $\epsilon^{-1}D$ by using the fact that the electric field vector E in the birefringent material satisfies an equation of D=εE, and that D and ε are already known (since the refractive index ellipsoid is already known, ε is also already known from an equation of $\eta^2=\epsilon/\epsilon_o$).

Further, for the magnetic field vector H and the flux density vector B, seen in FIG. 5, an equation of H//B//k×D is established. Since the direction of the magnetic field vector H is known, the direction of the ray vector S is determined from the previously determined electric field vector E using S=E×H.

This equation is established at the time of reflection. The birefringent material separates generally in two directions at the interface in a manner similar to the aforementioned case because the birefringent material exhibits different refractive indices with respect to the ray wave surface vector k and the inherent vector D.

With respect to the aforementioned point, the e-ray (with walk-off) in FIG. 3 shows a case where the ray is tracked. By way of reference, FIG. 3 is a view showing the situation wherein reflection is not induced within the crystal.

(1-2) Polarization component separation element (Y-direction separation type)

Figure 6A:
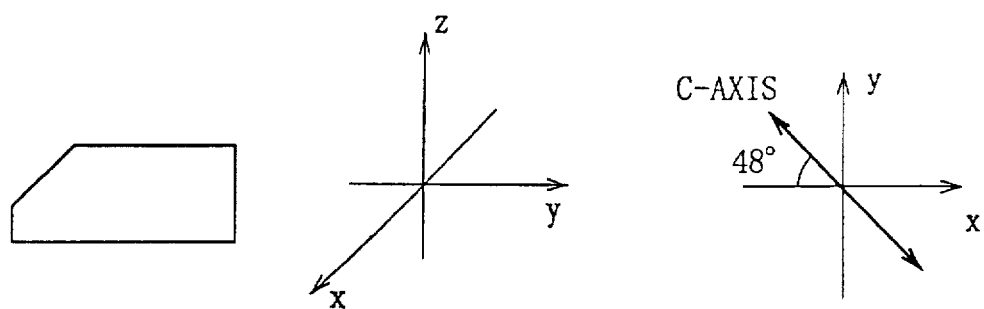
FIGS. 6A, 6B, 7A and 7B are schematic diagrams showing a spot group which separated after being reflected in a polarization component separation element in accordance with a first separation technique.
Figure 6B:
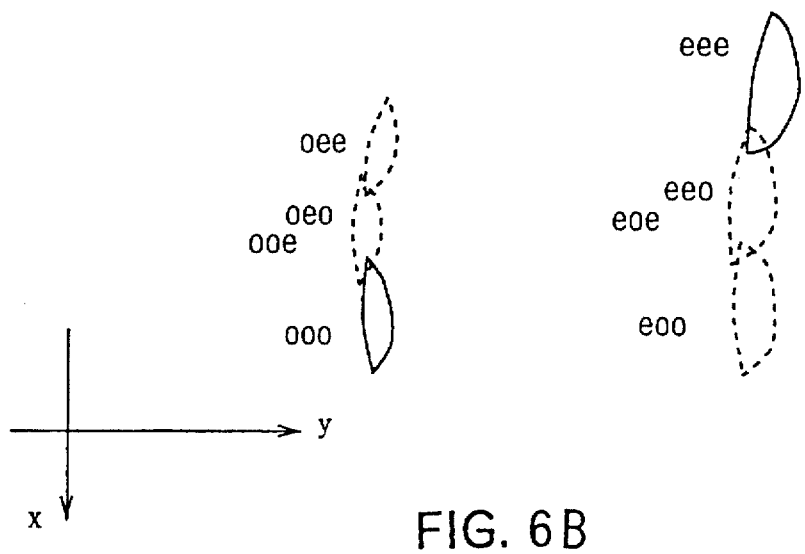
Figure 7:
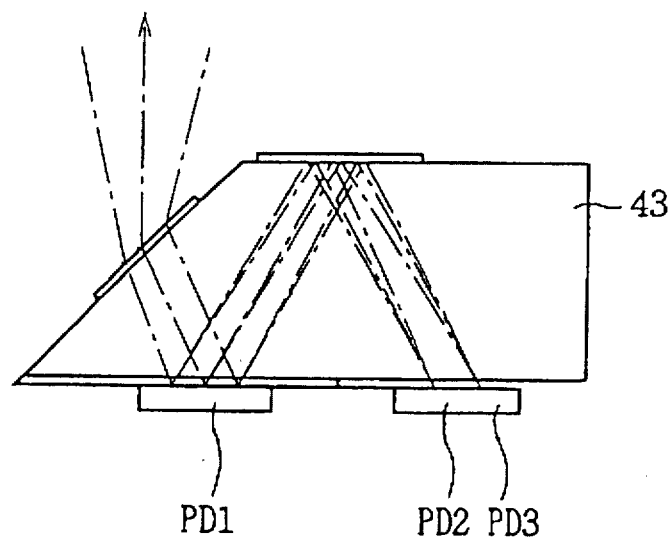
Figure 7:
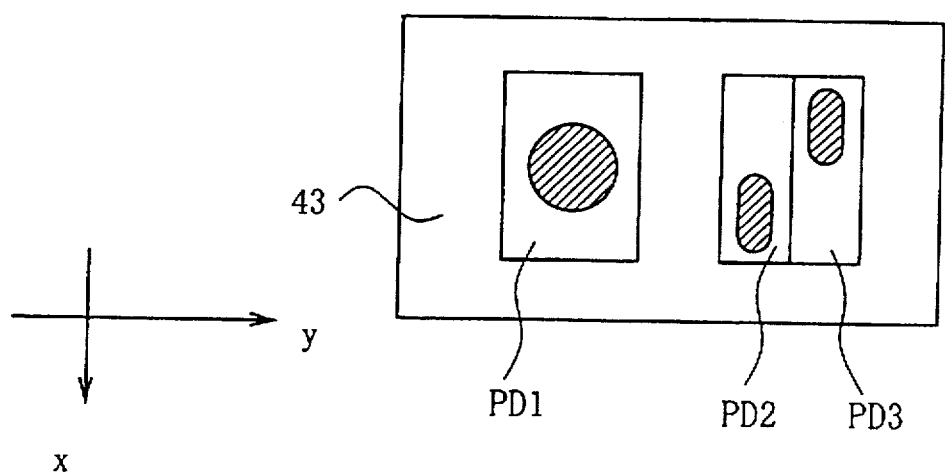

Next, the structure of a polarization component separation element according to this facet of the invention will be explained. The polarization component separation element is set so that an optical axis of a uniaxial crystal is on a surface perpendicular to a normal line of the reflection surface as shown in FIG. 6A. The polarization component separation element is used in a manner wherein the incident ray is reflected at least once within the crystal. In this embodiment, for example, "oeo" denotes the situation wherein an "ordinary ray" changes to an "extra ordinary ray" which then changes back to an "ordinary ray" as a result of the two sequential reflections. Under these conditions, a P-polarization component and a S-polarization component are separated in the direction of the Y-axis as shown in FIG. 6B. FIGS. 7A and 7B show how, under the above conditions, the light spots focus on light photodetectors PD1, PD2 and PD3 and wherein spots "ooo" and "eee", which are disclosed in more detail below, condense in an obliquely separated manner on serially arranged photodetectors PD2 and PD3.

In the case of this polarization component separation element, the optical properties of the crystal are suppressed so that neither a phase difference nor a reflection rate difference are generated in the P-polarization component and the S-polarization component before and after reflection. When the optical properties are suppressed, the relation between an inherent polarization component vector D, and the S-polarization component, and the relation between the inherent polarization component vector D and the P-polarization component are conserved before and after the reflection. In addition, the inherent refractive indices are consistent before and after the reflection. Consequently, the separation of the ray on the reflection surface is not achieved and only the two spots "ooo" and "eee" are completely separated and respectively focussed on the photodetectors PD2 and PD3.

Figure 8A:
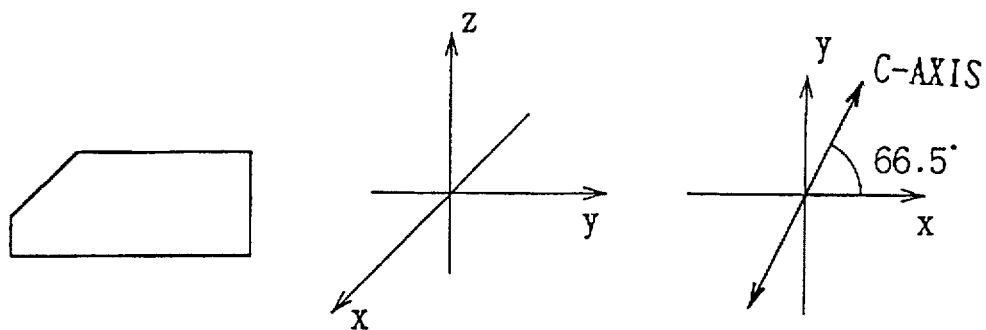
FIGS. 8A, 8B, 9A and 9B are schematic diagrams showing a spot group which separated after being reflected in a polarization component separation element in accordance with a second separation technique.
Figure 9:
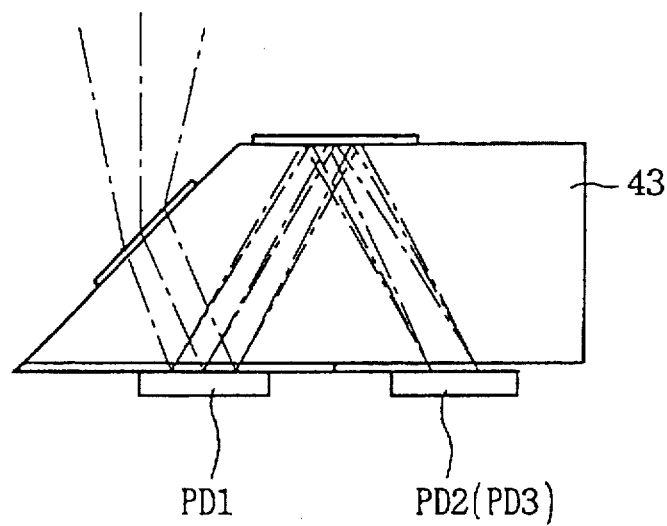
Figure 9:
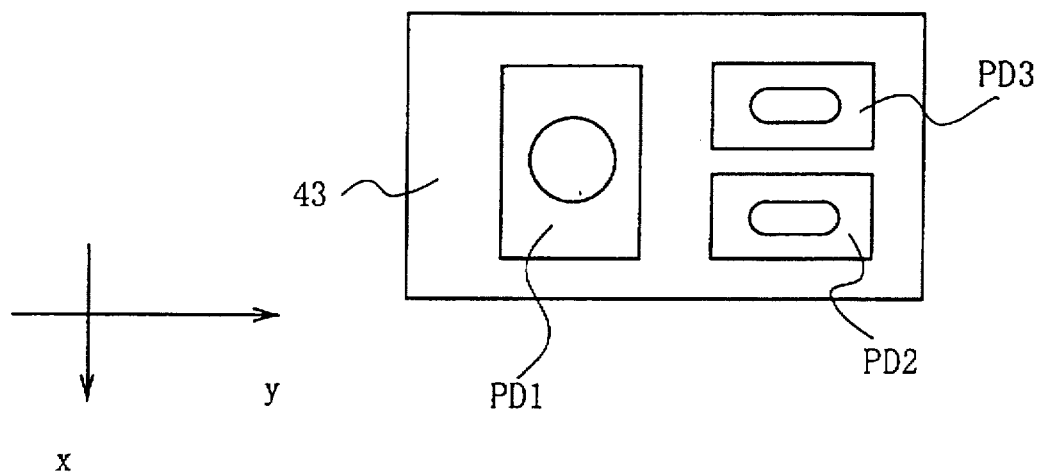

It will be noted, by way of example, that in the case wherein the C-AXIS is 48° (see FIG. 6A), the amount of the ooo-ray which impinges on photodetector PD2 (see FIG. 7B) is equal to the amount of the eee-ray which impinges on the photodetector PD3, while when the C-AXIS is 66.5° (see FIG. 8A) the amount of the eoe-ray on the photodetector PD2 is equal to the amount of the oeo-ray impinging on the photodetector PD3 (see FIG. 9B).

Even when the phase difference and the reflection rate difference are generated and the spot is separated before and after the reflection, the first separated light spot is somewhat expanded by the reflection process, but the second light spot is clearly separated into two spot groups. When the differential output obtained from these two spot groups is determined, the opto-magnetic signal can be obtained.

It should be noted that the aforementioned polarization component separation element has a uniaxial crystal structure. In the case where the crystal has a biaxial crystal structure, a direction which corresponds to the refractive index having a larger difference of the refractive index from the intermediate refractive index out of the refractive directions of the crystal is set in a surface perpendicular to the normal line of the reflection surface. Also in this case, the incident ray is reflected at least once within the crystal. By way of reference, two approximate refractive indices out of three are set as "no" and the remaining one is set to "ne", so that the refractive indices can be easily coped with.

Further, in this structure, if a direction which corresponds to the intermediate refractive index out of the three, is set in a direction parallel to a normal line of the reflection surface, the difference between "no" and "ne" is made ostensibly larger (the separation angle of the ray can be made larger) so that an optimally practical polarization component separation element can be achieved.

In the case of the biaxial crystals, an effect can be obtained which is similar to one obtained in the case of the uniaxial crystal. Consequently, the polarization component separation element can be selected from a wide selection of crystal material and thus enable a large design freedom.

(1-3) Polarization component separation element (X-direction separation type)

It should be noted that the above description of has been given with respect to a polarization component separation element in which a spot is subject to further separation in the Y direction. However, in accordance with this aspect of the invention, a second separation occurs in the X direction.

Figure 8B:
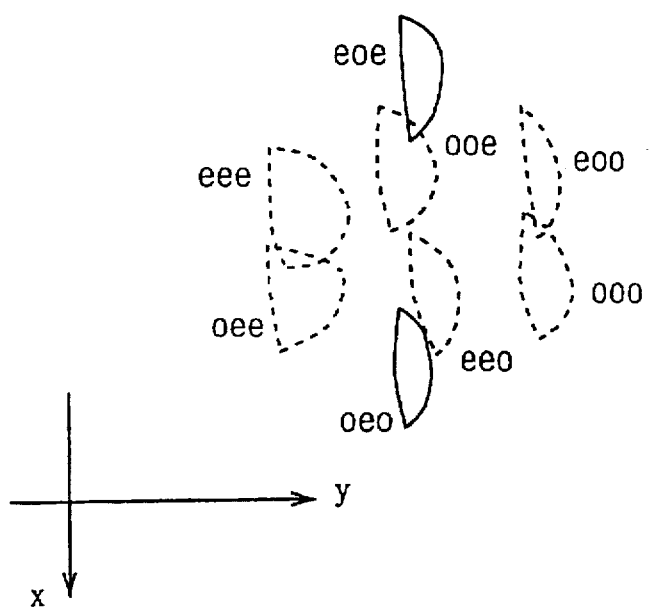

As shown in FIG. 8A, this polarization component separation element is used so that an optical axis of an uniaxial crystal is set in a surface parallel to a normal line of an incident surface of a primary ray incident on the crystal and a normal line of the reflection surface and an incident ray is reflected at least once in the crystal. At this time, the P-polarization component and the S-polarization component are separated in the direction of X-axis with the result depicted in FIG. 8B and FIGS. 9A and 9B.

In this manner, the separation direction of the polarization components can be changed only by changing the position of the optical axis even when the same uniaxial crystal is used, enabling latitude in the design of the optical system using a detection method of a servo error and PD separation method.

Incidentally, if a biaxial crystal is used in the polarization component separation element, a direction which corresponds to the refractive index having a larger difference of refractive index from the intermediate refractive index out of the refractive index directions of the crystal, is set in a surface parallel to a normal line of the incident surface of a primary ray incident on the crystal and parallel to a normal line of the reflection surface. Even with such a procedure, a similar effect can be obtained as described above.

Further, in this structure, a direction which corresponds to the intermediate refractive index out of the three refractive indices of the crystal is set so that the direction becomes parallel to both of an incident surface of a primary ray incident on the crystal and a normal line of the reflection surface thereof. Thereby, the difference between "no" and "ne" is ostensibly enlarged so that the ray separation angle is enlarged with the result that an optimally practical polarization component separation element can be achieved.

Further, in the case of such biaxial crystals, an effect can be obtained which is similar to one obtained with a uniaxial crystal. Consequently, a wide selection of crystal material and freedom in design with respect to the polarization component separation element is possible.

Since no attention needs to be paid to the precision with which lamination is carried out, a highly precise polarization component separation element can be readily manufactured.

In addition, as the polarization component separation element consists of a single piece of birefringence material, the polarization component separation element does not exhibit any change with the passage of time.

(2) Opto-magnetic signal reproducing apparatus

Figures 10A, 10B, 10C:
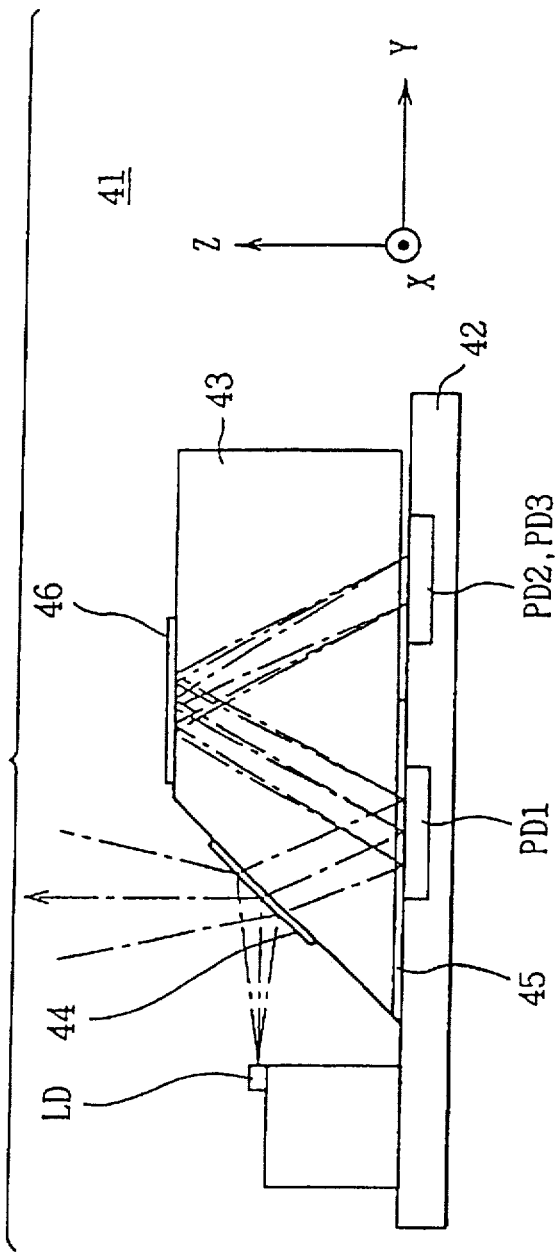
FIG. 10 is a schematic side sectional view showing the structure of an optical pickup.
Figure 11:
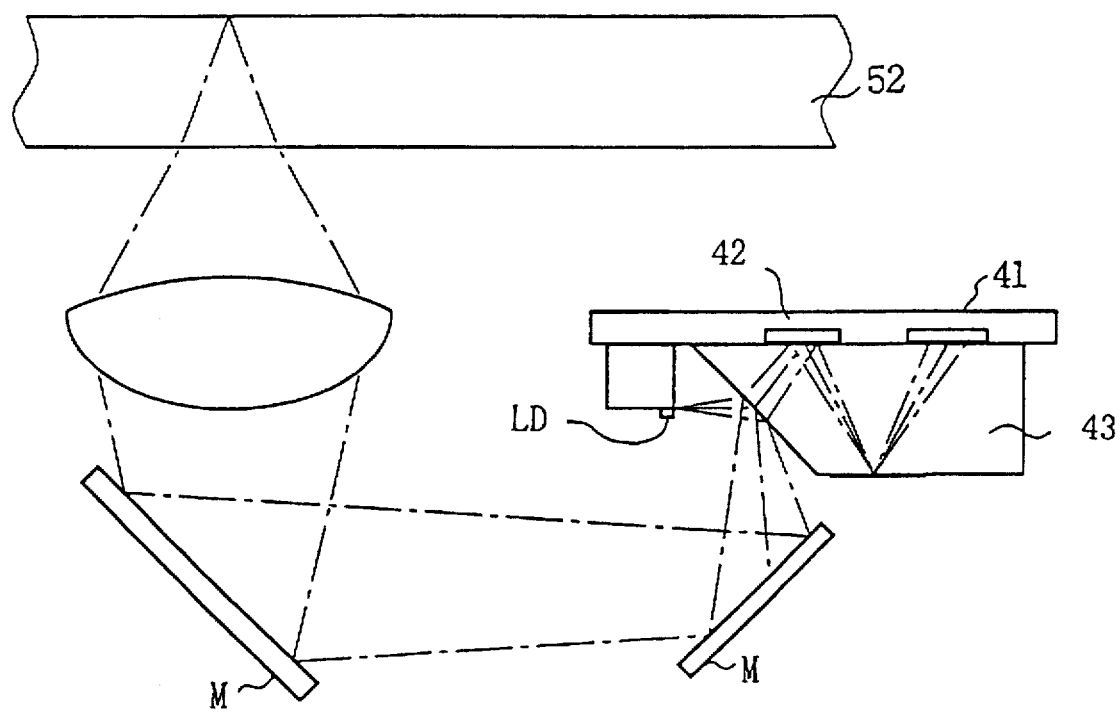
FIG. 11 is a schematic side view showing the attachment position of the optical pickup in an opto-magnetic signal reproducing apparatus.
Figure 12:
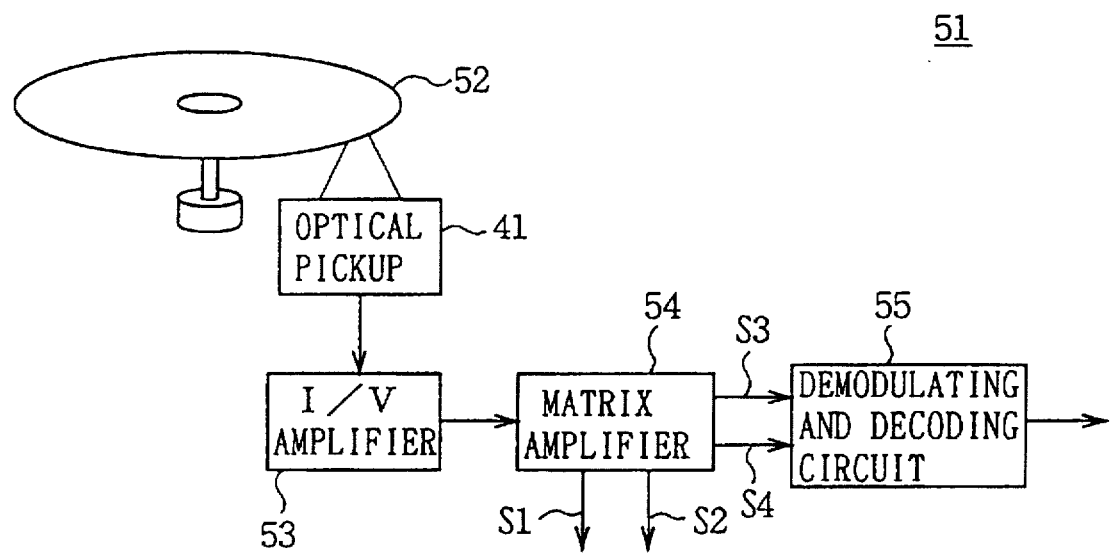
FIG. 12 is a block diagram showing the circuit arrangement of an opto-magnetic signal reproducing apparatus according to the present invention.

FIG. 10 shows an optical pickup which uses the polarization component separation element described in the previous section. Furthermore, FIG. 11 shows an optical system of an opto-magnetic signal recording and reproducing apparatus using the optical pickup. FIG. 12 shows, in block diagram form, a circuit arrangement suitable for use with the polarization component separation element embodiments of the invention.

As shown in FIG. 10 the optical pickup 41 comprises a laser diode LD and a polarization component separation element 43 on a semiconductor substrate 42 on which photodetectors PD1 through PD3 are integrated. The polarization component separation element 43 shown in this figure is a crystal element of the type described above and in which the ray is reflected twice within the crystal. Here, the polarization component separation element 43 has a trapezoidal-shaped section, and is arranged so that the laser light is reflected by the polarizing beam splitter film 44 which is formed on an inclined surface of the element 43 opposite the laser diode LD, so as to be irradiated onto a recording surface of the opto-magnetic disc. By way of reference, the polarizing beam splitter film 44 includes Ts=35% and Tp=70%.

The returned light which is reflected from the recording surface of the opto-magnetic disc is introduced into the crystal 43 by way of the polarizing beam splitter film 44 so that a part of the returned light is directed to the photodetector PD1 on the bottom of the polarization component separation element 43 via a semi-transparent film 45. On the other hand, the laser light which is reflected off the semi-transparent film 45 bottom of the polarization component separation element 43 is directed to the reflection film 46 provided on the upper surface of the polarization component separation element 43 to be again reflected and condensed onto the photodetectors PD2 and PD3 at the bottom of the polarization component separation element 43.

An electric signal output from these photodetectors PD1 through PD3 are current-to-voltage converted via an I/V amplifier 53 and then supplied to a matrix amplifier 54 (see FIG. 12).

At this time, the matrix amplifier 54 outputs a difference in the output signal obtained from the photodetectors PD2 and PD3 as an opto-magnetic signal S3, and also outputs the sum of the output signal obtained from the photodetectors PD1 through PD3 or at least one of the output signals as pit signal S4. The matrix amplifier 54 calculates and outputs a focus error signal S2 from the output signal of photodetector PD1 and at least one of the output signals of the photodetectors PD2 and PD3 to calculate and output a tracking error signal S1 from at least one of the photodetectors PD1 through PD3.

A demodulating and decoding circuit 55 reproduces information recorded in the opto-magnetic disc 54 on the basis of the input opto-magnetic signal S3 and the pit signal S4, and outputs this information to a processing circuit at the rear stage.

According to the structure mentioned above, an optical pickup can be miniaturized and made compact by using an optical pickup which utilizes a polarization component separation element 43 and a light emitting element which satisfy the conditions described above. Reduction in adjusting processes and improvement in reliability can be achieved by this type of optical pickup. Further, a small-size opto-magnetic signal reproducing apparatus compared with the conventional counterparts can be realized by utilizing such a small-size optical pickup.

(3) Alternative embodiments

In the above-disclosed embodiments, the light ray which is incident on the polarization component separation element is reflected only twice within a birefringent crystal. However, the reflection frequency is not limited to two, and the reflection frequency can be three or more. When the reflection frequency is increased, the spot separation can be improved along with the manufacturing tolerance. Furthermore, in this case, the polarization component separation element can be made thin, while adequate spot separation can still be achieved. By way of example, FIG. 13 shows a polarization component separation element 43' in which the reflection frequency in the crystal is four, as shown at surface reflections a, b, c, d. The effect of the increased number of reflections on the separation resolution is self-evident from the lower portion of this figure.

The aforementioned embodiments have been described in connection with an optical pickup for use in an opto-magnetic disc. However, the present invention is not limited to this use and the present invention can be also applied to an optical pickup used for reading information from a rewritable compact disc (MO-CD) or an optical recording medium such as an optical tape. Similarly, the present invention is not limited to use with opto-magnetic disc reproducing apparatus and can be applied to an optical apparatus such as an optical tape recorder.

As described above, in accordance with the present invention, by forming a polarization component separation element using a single piece (unit) of birefringent material, precise lamination of multiple elements is not necessary.

While the present invention has been described in connection with the preferred embodiments, it will be obvious to those skilled in the art that various changes and modifications may be made without departing from the true spirit and scope of the invention which is limited only the appended claims.

What is claimed is:

1. An optical pickup apparatus comprising:

a semiconductor substrate on which a plurality of light receiving elements are formed;

a light emitting element for emitting light beam;

a polarization component separation element disposed on said light receiving elements, for separating said light beam into a plurality of separated light beams, wherein said polarization component separation element consists of a unit of a birefringence material which guides the separated light beams to the plurality of light receiving elements.

2. An optical pickup apparatus as set forth in claim 1, wherein said birefringence material exhibits birefringence as a polarization component separation element wherein incident light is split and separated on the basis of its polarization components and wherein the separated components are multiply-reflected within the element to promote separation.

3. An optical pickup apparatus according to claim 1, wherein said polarization component separation element consists of a uniaxial crystal of birefringence material.

4. An optical pickup apparatus according to claim 3, wherein said polarization component separation element includes means for reflecting said light beam at least once either within said element or in the vicinity of an interface of said crystal.

5. An optical apparatus according to claim 4, wherein an optical axis of said uniaxial crystal is set in a surface perpendicular to a line normal to a reflection surface.

6. An optical pickup apparatus according to claim 1, wherein said polarization component separation element consists of a biaxial crystal of birefringence material.

7. An optical pickup apparatus according to claim 6, wherein said polarization component separation element reflects said light beam at least once in said polarization component separation element or in the vicinity of an interface of said crystal.

8. An optical pickup apparatus according to claim 7, wherein, in said polarization component separation element, a separation direction of said light beam which corresponds to a refractive index of the device having a larger difference of refractive index from an intermediate refractive index from among the refractive index directions of said biaxial crystal is set in a surface perpendicular to a normal line of the reflection surface of said polarization component separation element.

9. An optical pickup apparatus according to claim 7, wherein, in said polarization component separation element, a separation direction of said light beam which corresponds to an intermediate refractive index out from among three refractive index directions of said biaxial crystal is parallel to a line normal to the reflection surface.

10. An optical pickup apparatus comprising:

a semiconductor substrate on which a plurality of light receiving areas are formed;

a light emitting element for emitting a light beam, said light emitting element being mounted on said semiconductor substrate; and a polarization separation prism for separating said light beam and mounted on said light receiving elements, wherein said prism consists of a single piece of birefringent material and includes means for reflecting said light beam at least once in said prism or in the vicinity of an interface whereat said light beam passes into said prism.

11. An optical pickup apparatus according to claim 10, wherein said prism has a first surface for receiving said beam, a second surface for transmitting a part of said beam and for reflecting another part of said beam, and a third surface for reflecting said beam, said second surface being disposed over said light receiving areas.

12. An optical pickup apparatus according to claim 11, wherein said first surface is opposite said light emitting element.

13. An optical pickup apparatus according to claim 11, wherein said first surface supports a polarizing beam splitter film.

14. An optical pickup apparatus according to claim 10, wherein said polarizing separation prism consists of a uniaxial crystal of birefringence material.

15. An optical pickup apparatus according to claim 10, wherein said polarizing separation prism consists of a biaxial crystal of birefringence material.

16. An optical pickup apparatus as set forth in claim 10, wherein said birefringence material exhibits birefringence as a polarization component separation element wherein incident light is split and separated on the basis of its polarization components and wherein the separated components are multiply-reflected within the element to promote separation.

17. An opto-magnetic signal reproducing apparatus comprising:

a semiconductor substrate on which a plurality of light detecting elements are formed;

a light emitting element for emitting light beam;

a polarization component separation element for splitting said light beam, wherein said polarization component separation element consists of only one element of a birefringence material and for splitting said light beam and for guiding the split light beam to said light receiving elements; and a signal processing circuit for reproducing an opto-magnetic signal on basis of output from said light detecting elements.

18. An opto-magnetic signal reproducing apparatus as set forth in claim 17, wherein said birefringence material exhibits birefringence as a polarization component separation element wherein incident light is split and separated on the basis of its polarization components and wherein the separated components are multiply-reflected within the element to promote separation.

19. An opto-magnetic signal reproducing apparatus according to claim 17, wherein said one element of said polarization component separation element has first surface for receiving said beam, a second surface for transmitting a part of said beam and for reflecting another part of said beam, and third surface for reflecting said beam, said second surface being disposed on said light receiving elements.

20. An opto-magnetic signal reproducing apparatus according to claim 17, wherein said light emitting element is formed on a said semiconductor substrate.

21. An opto-magnetic signal reproducing apparatus according to claim 17, wherein said signal processing circuit generates a focusing error signal and a tracking signal on basis outputs from said light detecting elements.

22. An opto-magnetic signal reproducing apparatus according to claim 17, wherein said polarization component separation element is mounted on said light receiving elements.

23. An opto-magnetic signal reproducing apparatus according to claim 17, wherein said polarization component separation element reflects said light beam at least once in said polarization component separation element or in the vicinity of an interface of said polarization component separation element.

* * * * *